June 23, 1931. D. H. BITNEY Re. 18,107

STRUCTURAL UNIT

Original Filed Aug. 11, 1927

INVENTOR
Dewey H. Bitney
BY Chappell & Earl
ATTORNEY

Reissued June 23, 1931

Re. 18,107

UNITED STATES PATENT OFFICE

DEWEY H. BITNEY, OF ALBION, MICHIGAN, ASSIGNOR TO UNION STEEL PRODUCTS COMPANY, OF ALBION, MICHIGAN

STRUCTURAL UNIT

Original No. 1,706,558, dated March 26, 1929, Serial No. 212,244, filed August 11, 1927. Application for reissue filed August 1, 1930. Serial No. 472,429.

The main object of this invention is to provide an improved structural unit adapted as a bolster or support for the reinforcing bars of concrete structures.

A further object is to provide a structural unit of this character which is very economical in structure and very effective for the purpose and is adapted for use in a variety of relations.

Objects relating to details and economies of construction and operation of my invention will definitely appear from the detailed description to follow. The invention is defined and pointed out in the claims.

A structure which is a preferred embodiment of my invention is illustrated in the accompanying drawing, in which.

Figure 1:
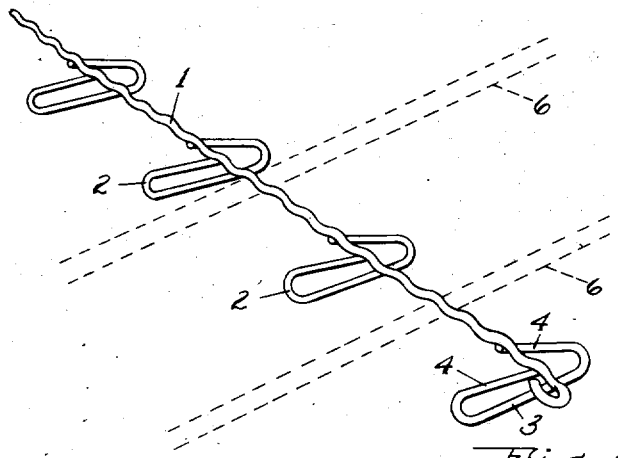
Fig. 1 is a fragmentary perspective view of a structural unit embodying the features of my invention, a pair of reinforcing bars being indicated by dotted lines in operative relation to the support.
Figure 2:
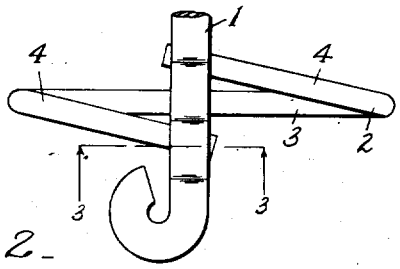
Fig. 2 is a fragmentary plan view.
Figure 3:
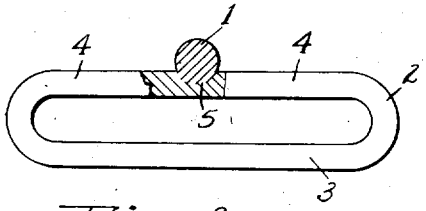
Fig. 3 is a fragmentary section on a line corresponding to line 3—3 of Fig. 2.

In the embodiment illustrated in the accompanying drawing, my improved reinforcing support comprises a longitudinal rod 1 which is preferably corrugated, the corrugations being disposed in a vertical plane. This rod is supported by a plurality of spaced feet 2 formed of loops of wire or light rod, as may be required, these loops being elongated and disposed with their closed side downward, forming base members 3, their arms 4 being disposed oppositely and at an angle to their base members, that is, the ends of the arms lie at an angle to the plane of the base member and at opposite sides thereof. The arms are secured by welding to the side of the longitudinal rod as indicated at 5 in Fig. 3.

By thus disposing the arms, the tipping strain on the feet is minimized when under load and they are secured to the longitudinal rods so that they are not likely to be broken off.

The corrugations are uniformly spaced so as to constitute a unit of measure. The corrugations in the structures as manufactured for the market are one inch apart so that the bars may be easily spaced according to specifications. The corrugations assist also in retaining the bars in their spaced position as when the bars are wired to the support they cannot slip along thereon. It is quite common practice to manufacture supports for the spacing designed for. In the applicant's structure this is not necessary.

The units may be formed of standard length and cut to meet the particular requirements.

I have not attempted to illustrate or describe certain modifications and adaptations which I contemplate as I believe this disclosure will enable those skilled in the art to embody or adapt my improvements as may be desired.

Having thus described my invention what I claim as new and desire to secure by Letters Patent is:

1. A structural unit comprising a corrugated longitudinal supporting rod disposed with its corrugations in a vertical plane, and a plurality of feet formed of elongated loops of wire disposed transversely of the longitudinal rod with their closed sides downward and constituting base members, the arms of the loops being disposed oppositely and at an angle to the base members and welded to the underside of the rod.

2. A structural unit comprising a longitudinal supporting rod, and a plurality of feet formed of elongated loops of wire disposed transversely of the longitudinal rod with their closed sides downward and constituting base members, the arms of the loops being disposed oppositely and at an angle to the base members and welded to the rod.

3. A structural unit comprising a longitudinal supporting rod, and a plurality of feet formed of elongated loops disposed transversely of said longitudinal rod with their closed sides downward and constituting base members, the arms of the loops being separated and welded to the rod in planes on opposite sides of the vertical plane of the base member.

4. A reinforce bar support comprising a corrugated longitudinal supporting rod disposed with its corrugations in a vertical plane, the corrugations being of uniform depth throughout the length of the rod and uniformly spaced and comparatively shallow relative to the length of the rod and constituting seats with which reinforce bars to be supported may be selectively engaged, and supporting feet for said bar welded on the under side thereof in spaced relation.

5. A reinforce bar support comprising a corrugated longitudinal rod disposed with its corrugations in a vertical plane, the corrugations being uniformly spaced and comparatively shallow relative to the length of the rod and constituting seats with which reinforce bars to be supported may be selectively engaged, and supporting feet for said longitudinal bar fixedly secured thereto in spaced relation.

6. A reinforce bar support comprising a corrugated longitudinal supporting rod disposed with its corrugations in a vertical plane, the corrugations being comparatively shallow relative to the length of the rod and constituting seats with which the elements to be supported may be selectively engaged, and supporting feet for said rod fixedly secured thereto in spaced relation.

In witness whereof, I have hereunto set my hand.

DEWEY H. BITNEY.